Figure 1:
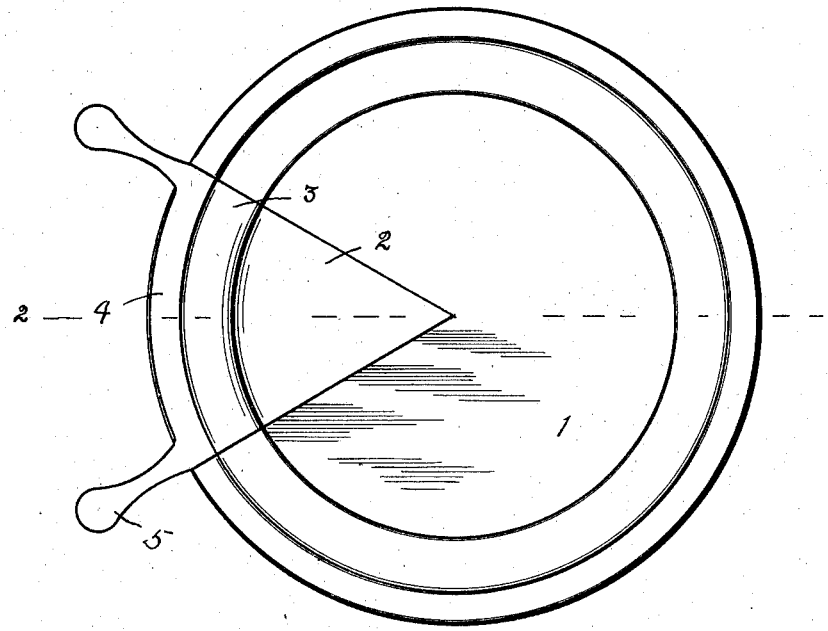

Feb. 11, 1930.  H. G. SIBBALD  1,746,614
PIE PAN
Filed Jan. 15, 1929

Inventor
Henrietta G. Sibbald.
By Geo Stevens.
Attorney

Patented Feb. 11, 1930

1,746,614

UNITED STATES PATENT OFFICE

HENRIETTA G. SIBBALD, OF DULUTH, MINNESOTA

PIE PAN

Application filed January 15, 1929. Serial No. 332,601.

This invention relates to culinary utensils and has special reference to a novel instrument for the more convenient handling of pie or the like.

The principal object is to provide such a device of simple construction, and one which will assure the successful handling of a piece of pie, irrespective of its consistency.

Another object is to provide such a device which may be allowed to remain within the pie tin or pan while the pie is being baked without in any way changing or altering the pie pan.

A further object is to provide such a device which, after the first piece of pie has been removed, may be conveniently used in the removal of subsequent pieces by the slipping of same therebeneath and removing, as with the original piece.

Still another object is to provide such a device which will remain in registrable relation with the pie tin or pan with which it is used, and which may be used independently for lifting and conveying purposes in the art.

Other objects and advantages of the invention will appear in the following description thereof.

Figure 2:
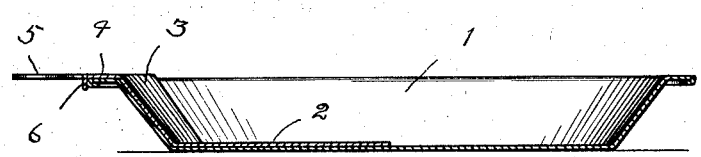

Referring now to the accompanying drawing, forming part of this application, and wherein like reference characters indicate like parts:

Figure 1 is a plan view of a pin pan having one of the improved spatulas or lifters applied thereto; and Figure 2 is a vertical section taken on the line 2—2 of Figure 1.

1 represents a common pie tin or pan and the spatula, comprises a pie shaped piece of sheet metal, preferably of a material similar to that of which the pan is made and of a size preferably equal to approximately one-sixth of the entire area of the pan, though as is obvious the dimension may be varied as desired.

The bottom or flat portion of the spatula is illustrated at 2 and is designed to lie prone upon the bottom of the pan; the inclined or wall portion is shown at 3 and the rim at 4. At either termini of the rim 4 is formed a horizontally extending handle 5 which may or may not be the exact form illustrated. Intermediate of the handles 5 is formed upon the rim 4 a depending flange 16 which is designed to fit over the edge of the pie pan and assist in holding the spatula in its proper relation to the interior of the pan, but still readily removable from same.

It is to be noted that the handles, being as it were upon the outermost corners of the spatula, assist materially in the manipulation of same when being forced circumferentially about the pan under subsequent pieces of pie to be removed therefrom. Inasmuch as it is well known to those versed in the art that the most desirable, at least the most palatable, pie, is that which is the most difficult to handle in removing same from a receptacle, this feature of the invention is paramount. While these handles upon the corners of the device may answer in the manipulation of same either in functioning as just described or in conveying the piece of pie to another receptacle, it must also be noted that the rim of the spatula may also be conveniently grasped in the manipulation of same either in conveying a piece of pie or in lifting or scraping other objects.

Another advantage in this device is the feature of sanitation in that it being wholly independent of the receptacle with which it is designed to be used may readily be cleaned, and which is not true of other devices which are designed to function somewhat similarly.

A further advantage in the use of the device is that of economy, as it is well known that in the service of an exceptionally palatable pie resort is frequently had to the use of whipped cream or the like in covering up the broken or fragmental pieces thereof, which is obviously avoided in the use of my invention.

Having thus described my invention, what

I claim and desire to secure by Letters Patent, is:

The combination with a spatula-like instrument made in the form of a sector free at its center and to snugly fit the interior of a pie pan, of a handle upon either circumferential corner of the sector, and a depending flange extending from the base of one handle to the other for engagement with the rim of the pan, for the purpose described.

In testimony whereof I affix my signature.

HENRIETTA G. SIBBALD.